(12) United States Patent
Ozaki et al.

(10) Patent No.: US 12,518,102 B2
(45) Date of Patent: Jan. 6, 2026

(54) MEANING REPRESENTATION ANALYZING SYSTEM AND MEANING REPRESENTATION ANALYZING METHOD

(71) Applicant: HITACHI, LTD., Tokyo (JP)

(72) Inventors: Hiroaki Ozaki, Tokyo (JP); Gaku Morio, Tokyo (JP)

(73) Assignee: HITACHI, LTD., Tokyo (JP)

( * ) Notice: Subject to any disclaimer, the term of this patent is extended or adjusted under 35 U.S.C. 154(b) by 225 days.

(21) Appl. No.: 18/025,742

(22) PCT Filed: Aug. 23, 2021

(86) PCT No.: PCT/JP2021/030813
§ 371 (c)(1),
(2) Date: Mar. 10, 2023

(87) PCT Pub. No.: WO2022/091536
PCT Pub. Date: May 5, 2022

(65) Prior Publication Data
US 2023/0351112 A1 Nov. 2, 2023

(30) Foreign Application Priority Data
Oct. 27, 2020 (JP) .................................. 2020-179627

(51) Int. Cl.
| | |
|---|---|
| *G06F 40/30* | (2020.01) |
| *G06F 40/205* | (2020.01) |
| *G06F 40/284* | (2020.01) |
| *G06F 16/28* | (2019.01) |
| *G06F 16/901* | (2019.01) |

(52) U.S. Cl.
CPC ............ *G06F 40/30* (2020.01); *G06F 40/205* (2020.01); *G06F 40/284* (2020.01); *G06F 16/288* (2019.01); *G06F 16/9024* (2019.01)

(58) Field of Classification Search
CPC ..... G06F 16/288; G06F 16/9024; G06F 40/30
See application file for complete search history.

(56) References Cited

U.S. PATENT DOCUMENTS

2022/0050840 A1* 2/2022 Parravicini ............ G06N 5/025

OTHER PUBLICATIONS

Janssen, et al. "Large Data Flow Graphs in Limited GPU Memory," 2019 IEEE International Conference on Big Data (Big Data). (Year: 2019) (Year: 2019).*
Goodman, "AMR Normalization for Fairer Evaluation," arXiv: 1909.01568V2, 2019 (Year: 2019) (Year: 2019).*

(Continued)

*Primary Examiner* — Feng-Tzer Tzeng
(74) *Attorney, Agent, or Firm* — Procopio Cory Hargreaves & Savitch LLP

(57) ABSTRACT

A meaning representation parsing system 100 includes: an input unit 110 that accepts input data 210 in a text or a graph; and a serialized graph generating unit 120 that generates a token array (serialized graph 220) representing a graph structure corresponding to the input data 210. Furthermore, the token array generated by the serialized graph generating unit 120 includes at least a first token indicating a node in the graph structure corresponding to the input data 210 and a second token indicating an edge representing a relationship between the nodes.

9 Claims, 11 Drawing Sheets

(56) References Cited

OTHER PUBLICATIONS

Rik van Noord, et al. "Neural semantic parsing by character-based translation: Experiments with abstract meaning representations," Computational Linguistics in the Netherlands Journal, 2017 (Year: 2017) (Year: 2017).*
Janssen, et al. "Large Data Flow Graphs in Limited GPU Memory," 2019 IEEE International Conference on Big Data (Big Data)—see attached reference in the previous Office action. (Year: 2019).*
Goodman, "AMR Normalization for Fairer Evaluation," arXiv: 1909.01568V2, 2019—see attached reference in the previous Office action. (Year: 2019).*
Rik van Noord, et al. "Neural semantic parsing by character-based translation: Experiments with abstract meaning representations," Computational Linguistics in the Netherlands Journal, 2017—see attached reference in the previous Office action. (Year: 2017).*
Wanxiang Che et.al., 'HIT-SCIR at MRP 2019: A Unified Pipeline for Meaning Representation Parsing via Efficient Training and Effective Encoding', Proceedings of the Shared Task on Cross-Framework Meaning Representation Parsing at the 2019 CONLL, pp. 76-85 Hong Kong, Nov. 3, 2019.
Daniel Hershcovich et.al., 'Multitask Parsing Across Semantic Representations', Proceedings of the 56th Annual Meeting of the Association for Computational Linguistics (Long Papers), pp. 373-385, Melbourne, Australia, Jul. 15-20, 2018.
Patent Cooperation Treaty, International Search Report, Application No. PCT/JP2021/030813, dated Nov. 16, 2021, in 4 pages.

\* cited by examiner

FIG. 8

| | | 1 | 2 | 3 | 4 | 5 | 6 | 7 | 8 | 9 | 10 |
|---|---|---|---|---|---|---|---|---|---|---|---|
| 330 | | 1/take-10 2/it ARG0 [EOD] 3/long-03 2/it ARG1 [EOD] ARG1 [EOD] | | | | | | | | | |
| 331 | | 1/take-10 | 2/it | ARG0 | [EOD] | 3/long-03 | 2/it | ARG1 | [EOD] | ARG1 | [EOD] |
| 332 | | ADD (take-10) | ADD (it) | ARC (ARG0) | DELETE | ADD (long-03) | ADD (it) | ARC (ARG1) | DELETE | ARC (ARG1) | DELETE |
| 333 | | take-10 | it / take-10 | it / take-10 | take-10 | long-03 / take-10 | it / long-03 / take-10 | it / long-03 / take-10 | long-03 / take-10 | long-03 / take-10 | take-10 |

FIG. 10

| | 1/take-10 3/long-03 2/it 1 ARG0-of ARG1 ARG1 | | | | | | |
|---|---|---|---|---|---|---|---|
| | 1 | 2 | 3 | 4 | 5 | 6 | 7 |
| 341 | 1/take-10 | 3/long-03 | 2/it | 1 | ARG0-of | ARG1 | ARG1 |
| 342 | ADD (take-10) | ADD (long-03) | ADD (it) | SELECT (take-10) | ARC+DELETE (ARG0-of) | ARC+DELETE (ARG1) | ARC+DELETE (ARG1) |
| 343 | take-10 | long-03<br>take-10 | it<br>long-03<br>take-10 | take-10<br>it<br>long-03<br>take-10 | take-10<br>it<br>long-03<br>take-10 | it<br>long-03<br>take-10 | long-03<br>take-10 |

340

MEANING REPRESENTATION ANALYZING SYSTEM AND MEANING REPRESENTATION ANALYZING METHOD

BACKGROUND OF THE INVENTION

1. Field of the Invention

The present invention relates to a meaning representation parsing system and a meaning representation parsing method, and is suitably applied to a meaning representation parsing system and a meaning representation parsing method that parse a meaning of input data and constitute a graph structure indicating the meaning.

2. Description of the Related Art

Conventionally, representing meaning for a given text using a graph structure is called meaning representation parsing. The meaning representation parsing includes, in a broad sense, so-called Syntactic Parsing and Dependency Parsing that parse a relationship between words in a sentence, and also includes a technique of forming an abstract meaning representation graph that does not necessarily correspond to words in a sentence, and a technique of forming a graph representing a calculation formula from a written problem in mathematics or the like.

Methods for realizing meaning representation parsing include: a "Transition-based Parser" that segments a text that is input information into words (tokens) and the like and performs an operation (action) on the column (input token array) to constitute a meaning representation graph, and a "Graph-based Parser" that directly infers an adjacency matrix representing a relationship between input tokens with respect to an input token array.

Machine learning can be used to implement meaning representation parsing as described above. The Transition-based Parser can be realized by having a stack, extracting features from the stack, the input token array, the performed action, and the like, and then identifying the action to be performed. On the other hand, the Graph-based Parser can be realized by calculating a real value or the like representing the connectivity between the input tokens using the input token array. This real value can be calculated using a so-called attention mechanism in deep learning.

Recent progress in deep learning enables more complicated or abstract meaning representation parsing. For example, in the meaning representation of AMR (abstract meaning representation), there is no clear correspondence between a node in a graph and a word in a sentence, but by generating a node having no correspondence in a sentence by using an encoder-decoder architecture of deep learning, parsing can be performed by a method by transition or by adjacent matrix.

In addition, it is known that the types of meaning representation graphs vary depending on the purpose and application, and the parsing method with high accuracy is different for each type.

As a conventional technique related to the above background art, for example, Wanxiang Che et. al., HIT-SCIR at MRP 2019, A Unified Pipeline for Meaning Representation Parsing via Efficient Training and Effective Encoding discloses a means for accurately parsing various meaning representation graphs by transition. In addition, Daniel Hershcovich et. al., Multitask Parsing Across Semantic Representation discloses a parsing means by transition, and various meaning representation graphs can be parsed using the same set of actions.

SUMMARY OF THE INVENTION

However, the technique disclosed in Wanxiang Che et. al., HIT-SCIR at MRP 2019, A Unified Pipeline for Meaning Representation Parsing via Efficient Training and Effective Encoding is useful in that various meaning representation graphs can be accurately parsed by a Transition-based Parser, but there is a problem that it is necessary to redefine actions according to the types of meaning representation graphs, and various meaning representation graphs cannot be uniformly and accurately parsed. In addition, the technique disclosed in Daniel Hershcovich et. al., Multitask Parsing Across Semantic Representation is useful in that various meaning representation graphs can be parsed using the same set of actions, but, since a set of actions that enables all meaning representation graphs to be parsed to be parsed requires execution of an extra action as compared with a set of actions optimized for each meaning representation graph, there is a problem that parsing accuracy is significantly reduced when the same meaning representation graph is targeted as compared with the case of using the technique disclosed in Wanxiang Che et. al., HIT-SCIR at MRP 2019, A Unified Pipeline for Meaning Representation Parsing via Efficient Training and Effective Encoding.

The present invention has been made in view of the above points, and an object of the present invention is to propose a meaning representation parsing system and a meaning representation parsing method capable of uniformly and accurately parsing various meaning representations.

In order to solve such a problem, the present invention provides a meaning representation parsing system that parses a meaning representation of input data, the meaning representation parsing system including: an input unit that accepts the input data in a text or a graph; and a serialized graph generating unit that generates a token array representing a graph structure corresponding to the input data, in which the token array includes at least a first token indicating a node in the graph structure corresponding to the input data and a second token indicating an edge representing a relationship between the nodes.

In addition, in order to solve such a problem, the present invention provides a meaning representation parsing method by a meaning representation parsing system that parses a meaning representation of input data, the meaning representation parsing method including: an input step of accepting the input data in a text or a graph; and a serialized graph generating step of generating a token array representing a graph structure corresponding to the input data based on the input data accepted in the input step, in which the token array includes at least a first token indicating a node in the graph structure corresponding to the input data and a second token indicating an edge representing a relationship between the nodes.

According to the present invention, various meaning representations can be uniformly and accurately parsed.

BRIEF DESCRIPTION OF THE DRAWINGS

FIG. 8 is a diagram for describing a conversion procedure of the serialized graph in the first embodiment with a specific example;

FIG. 10 is a diagram for describing a conversion procedure of the serialized graph in the second embodiment with a specific example.

DESCRIPTION OF THE PREFERRED EMBODIMENTS

Hereinafter, embodiments of the present invention will be described in detail with reference to the drawings. In the following, the same or similar elements and processes will be denoted by the same reference symbols and differences will be described, and redundant description will be omitted. In addition, regarding the embodiments subsequently described, differences from the embodiment previously described will be described, and redundant description will be omitted. In addition, some or all of the respective embodiments and modifications thereof can be combined within the scope consistent with the gist of the present invention.

First Embodiment

Figure 1:
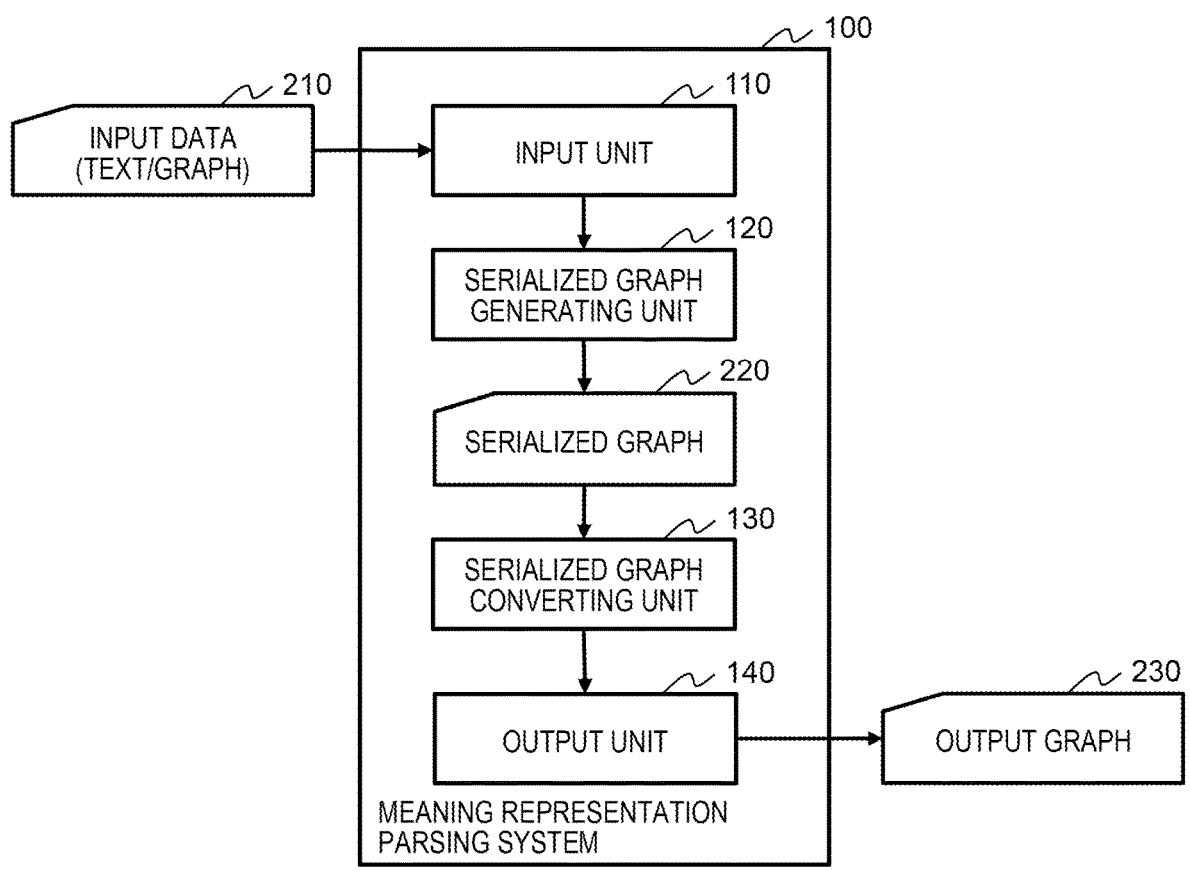
FIG. 1 is a block diagram illustrating a functional configuration example of a meaning representation parsing system 100 according to a first embodiment.

FIG. 1 is a block diagram illustrating a functional configuration example of a meaning representation parsing system 100 according to the first embodiment. In the meaning representation parsing system 100, input data 210 as a text or a graph is input, a serialized graph generating unit 120 generates a serialized graph 220 via an input unit 110, a serialized graph converting unit 130 converts the serialized graph 220 into a desired format, and then an output graph 230 visualized into a predetermined graph format is output in an output unit 140.

Here, a hardware configuration of the meaning representation parsing system 100 will be described first. The meaning representation parsing system 100 can be embodied by a computer device.

Figure 2:
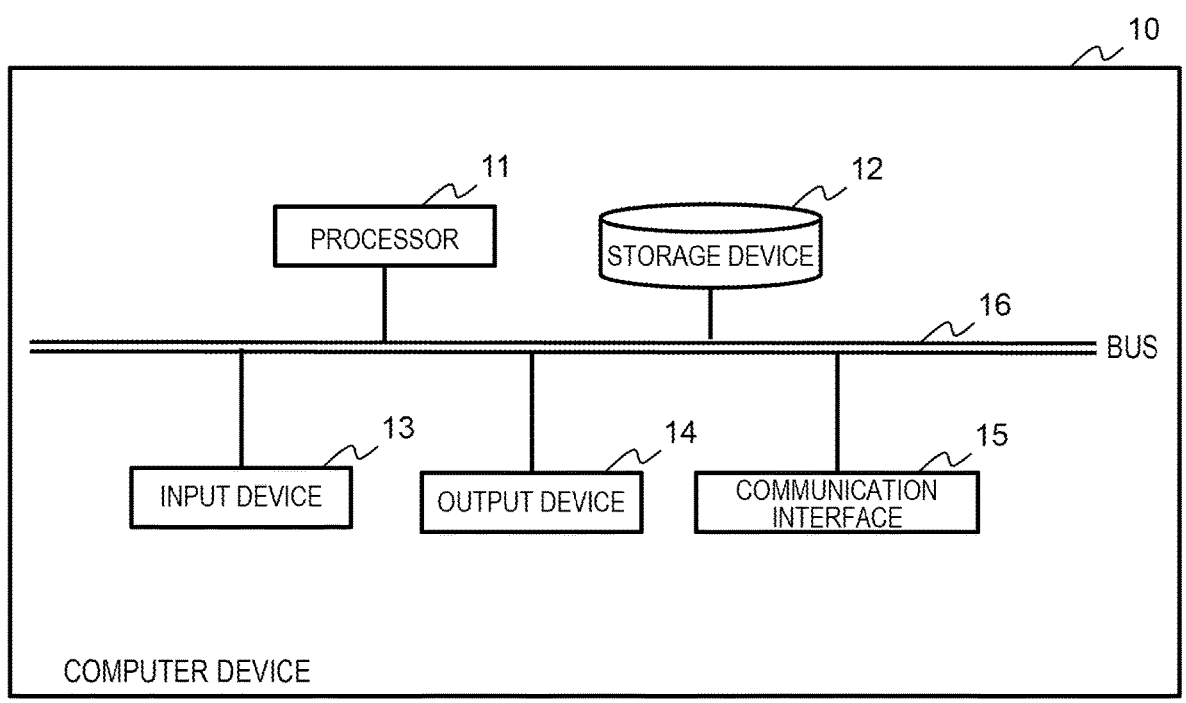
FIG. 2 is a block diagram illustrating a hardware configuration example of a computer device 10 that embodies the meaning representation parsing system 100.

FIG. 2 is a block diagram illustrating a hardware configuration example of a computer device 10 that embodies the meaning representation parsing system 100.

As illustrated in FIG. 2, the computer device 10 includes a processor 11, a storage device 12, an input device 13, an output device 14, and a communication interface 15, and the components are connected to each other via a bus 16.

The processor 11 has a function of controlling the computer device 10. The storage device 12 is a storage medium including a nonvolatile storage device or a volatile storage device that stores programs and data, and serves as a working area of the processor 11. A specific storage medium of the storage device 12 is not limited, and for example, a read only memory (ROM), a random access memory (RAM), a hard disk drive (HDD), or a flash memory such as a solid state drive (SSD) can be used. Furthermore, the processor 11 and the storage device 12 may be devices using a graphical processing unit (GPU).

Specifically, for example, each processing unit (input unit 110, serialized graph generating unit 120, serialized graph converting unit 130, and output unit 140) of the meaning representation parsing system 100 illustrated in FIG. 1 is embodied by the processor 11 executing a temporary or non-temporary program stored in the storage device 12. In addition, various data such as the input data 210, the serialized graph 220, and the output graph 230 handled by the meaning representation parsing system 100 are stored in, for example, the storage device 12. In addition, for example, various data held in node/edge information 133 in FIG. 6 to be described later is also stored in, for example, the storage device 12.

The processor 11 includes a single or a plurality of processing units. The processor 11 may also include a single or a plurality of operational units and a plurality of processing cores. The processor 11 is implemented as a single or a plurality of central processing units, microprocessors, digital signal processors, microcontrollers, microcomputers, state machines, logic circuits, graphics processing units, chip-on-system, or any device that performs signal manipulation by control instructions or the like.

In the computer device 10 that embodies the meaning representation parsing system 100, the program executed by the processor 11 may include an operating system (OS). Furthermore, the program executed by the processor 11 may include various programs such as a program for realizing the function of each processing unit of the meaning representation parsing system 100 (for example, an input program for the input unit 110, a serialized graph generating program for the serialized graph generating unit 120, a serialized graph converting program for the serialized graph converting unit 130, and an output program for the output unit 140). The processor 11 can function as the input unit 110, the serialized graph generating unit 120, the serialized graph converting unit 130, and the output unit 140 by executing and operating these programs described above.

In the computer device 10 illustrated in FIG. 2, software elements such as the OS and various programs are stored in any one of storage areas in the storage device 12. The OS and various programs may be recorded in a portable recording medium in advance, and in this case, the program is read from the portable recording medium by the medium reading device and stored in the storage device 12. In addition, the OS and various programs may be acquired via a communication medium.

The input device 13 is a device that executes an instruction and data input to the meaning representation parsing system 100 by the user, and is specifically embodied by, for example, a mouse, a keyboard, a touch panel, a microphone, a scanner, or the like.

The output device 14 is a device that executes data output from the meaning representation parsing system 100, and is specifically implemented by, for example, a display, a printer, a speaker, or the like.

The communication interface 15 is a device that is connected to an external network of the computer device 10 and transmits and receives various data handled by the meaning representation parsing system 100, and is specifically embodied by, for example, a network interface card (NIC) or the like. When the meaning representation parsing system 100 is embodied in the computer device 10 including the communication interface 15, the meaning representation parsing system 100 can be configured to transmit and receive data with respect to another terminal via the external network.

Note that the meaning representation parsing system 100 is not limited to the configuration embodied by a single computer (computer device) as in the computer device 10 illustrated in FIG. 2, and may be embodied by a computer system including a plurality of computers (computer devices). In this case, the computers can communicate with each other via a network, and for example, a plurality of functions of the language model processing device may be embodied separately in a plurality of computers.

The hardware configuration of the meaning representation parsing system 100 has been described above, and hereinafter, the functional configuration of the meaning representation parsing system 100 illustrated in FIG. 1 will be described again.

First, the input data 210 and the input unit 110 will be described.

As described above, the input data 210 takes the form of a text or a graph. In a case where the input data 210 is a text, the text is generally a single sentence, but may be a plurality of sentences, or may be a text that does not form a sentence such as an utterance or an ungrammatical sentence. The text may also be a symbol string having a certain graph structure. On the other hand, in a case where the input data 210 is a graph, the graph may be a meaningful unit having a graph structure. Given the above, in the present embodiment, parsing of a meaning representation graph from the input data 210 in a text will be described as an example.

The input unit 110 receives the input data 210 (as described above, the text in the present example) that the user desires to process, and converts the text or the graph of the input data 210 into a form that can be processed by the serialized graph generating unit 120. Specifically, for example, when the meaning representation parsing system 100 accepts an input of the input data 210 using the character user interface (CUI), the input unit 110 converts the text being input using the CUI into text data (for example, plain text) of an appropriate predetermined character code.

When the input data 210 is a graph, the input unit 110 converts the graph being input (input graph) into a serialized graph. The serialized graph generated at this stage is obtained by converting the input graph into an equivalent serialized graph, and is a graph different from the serialized graph generated by the serialized graph generating unit 120 to be described later, but is desirably in the same description format. In the following description, for the sake of distinction, the former serialized graph generated by the input unit 110 may be referred to as a "serialized graph converted from the input graph", and the latter serialized graph generated by the serialized graph generating unit 120 may be referred to as a "first serialized graph". However, the present invention can be applied even if the serialized graph converted from the input graph is not in the same description format as the first serialized graph. In a case where the input data 210 is a graph (input graph), a method by which the input unit 110 generates a serialized graph converted from an input graph equivalent to the input graph will be described later with reference to FIG. 9.

Next, the serialized graph generating unit 120 and the serialized graph 220 will be described.

The serialized graph generating unit 120 generates the serialized graph 220 based on the text data converted from the text input data 210 by the input unit 110, and outputs the generated serialized graph to the serialized graph converting unit 130. The serialized graph 220 generated by the serialized graph generating unit 120 is a graph obtained by serializing a meaning representation graph corresponding to the text that is the input data 210. Note that the serialization described herein means conversion into a format that can be regarded as a token array among formats that can express a structure constituted by edges of a meaning representation graph. In general, conversion into a format that can be directly output as text data can be regarded as serialization.

Figure 3:
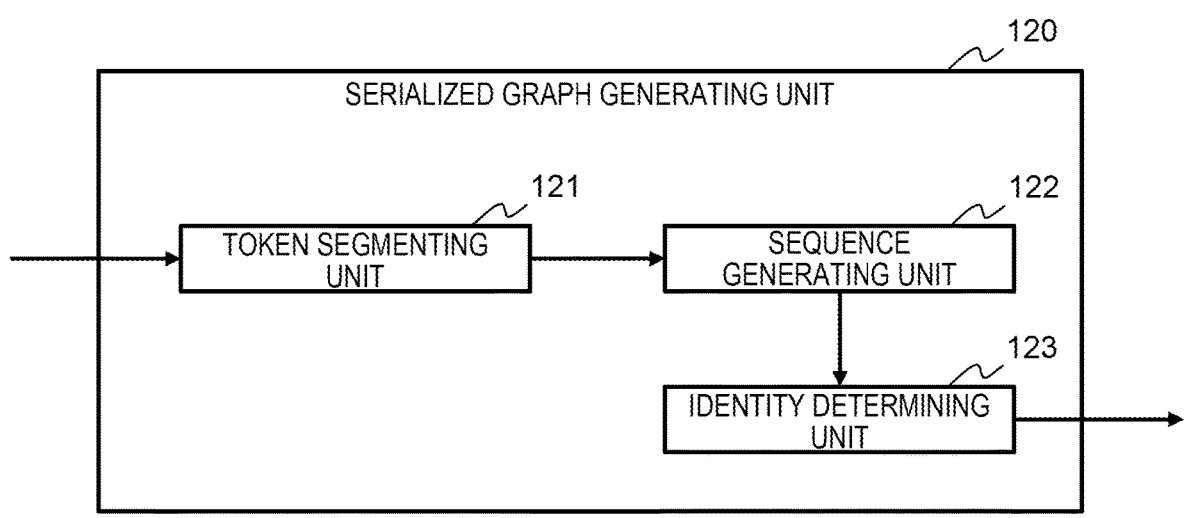
FIG. 3 is a block diagram illustrating an internal configuration example of a serialized graph generating unit 120.

FIG. 3 is a block diagram illustrating an internal configuration example of a serialized graph generating unit 120. As illustrated in FIG. 3, the serialized graph generating unit 120 includes a token segmenting unit 121, a sequence generating unit 122, and an identity determining unit 123.

The token segmenting unit 121 segments the text data received from the input unit 110 into appropriate token units, generates an input token array, and outputs the generated input token array to the sequence generating unit 122. In the segmentation by the token segmenting unit 121, so-called segmentation into words using morphological analysis, segmentation into character units, or segmentation using a statistical method may be performed, or segmentation into units that are finer than general words and coarser than characters may be performed, which is called sub-word segmentation. The token segmenting unit 121 can select a suitable segmenting method for the sequence generating unit 122 from the above segmenting methods.

The sequence generating unit 122 generates an output token array from the input token array generated by the token segmenting unit 121, and outputs the generated output token array to the identity determining unit 123. The sequence generating unit 122 is preferably configured by a neural network generally referred to as an encoder/decoder, but other means may be used as long as the means can output the token array with the token array as an input.

In a case of using a neural network of an encoder/decoder for the sequence generating unit 122, it is preferable to use a recurrent neural network or Transformer. When these neural networks are used for the sequence generating unit 122, even in a case where so-called beam search or the like is used, it can be regarded that output tokens are generated one by one.

Furthermore, in a case where Transformer is used, the sequence generating unit 122 digitizes the input token array, allocates a one-hot vector to each digitized token, and inputs the token array to Transformer (first Transformer) serving as an encoder. The first Transformer applies an operation using an attention mechanism to the one-hot vector to acquire a hidden representation for each token. Then, Transformer (second Transformer) serving as a decoder acquires an output token array by applying an operation using an attention mechanism using the hidden representation accepted from the first Transformer and the hidden representation of the decoder itself.

Note that, in the present embodiment, the input to the neural network is not limited to the token array, and any information may be used. In this case, for example, processing of inputting a part-of-speech and a named entity simultaneously with the token array is conceivable.

Furthermore, additional information can be assigned to the neural network of the encoder/decoder at the time of encoding or decoding. At this time, for example, it is conceivable to assign information such as the depth in the stack of the sequence (token array) being output and the parent node as the feature vector.

In the generation of the output token array by the sequence generating unit 122, when the first output token is generated, generally, all the input tokens and the special token indicating the start are used as inputs. In addition, when the generation of the output token array is terminated, a special token indicating termination is generated, or the termination is determined with a predetermined number of token outputs.

Furthermore, the sequence generating unit 122 uses all the input tokens and the output tokens generated so far as inputs at the time of generating each output token, but may use a hidden representation of the output token or various values or representations calculated from the hidden representation instead of the output token. Furthermore, information that can be inferred from the output token can be included in the input. For example, if the output token is a token representing a node (described in detail below), a distance from a root node (that is, how many edges should be passed to reach the root node from the node) can be added to the input.

The identity determining unit 123 determines a token representing the same node on the meaning representation graph from the sequence (output token array) generated by the sequence generating unit 122 (identity determination), and assigns information indicating identity to the corresponding token. For this identity determination, so-called hidden representation or the like generated by the neural network of the encoder/decoder can be used. More specifically, in a case where the identity determining unit 123 uses the hidden representation in the node identity determination, an identifier using the hidden representation of the token corresponding to any two nodes as an input, an attention mechanism for inferring a relationship between the hidden representations of the tokens corresponding to the nodes, or the like can be used. By including such an identity determining unit 123, the serialized graph generating unit 120 can perform processing of generating a serialized graph even for meaning representation graphs having different structures.

Hereinafter, a specific example of the serialized graph 220 generated by the above-described serialized graph generating unit 120 will be described.

Figure 4:
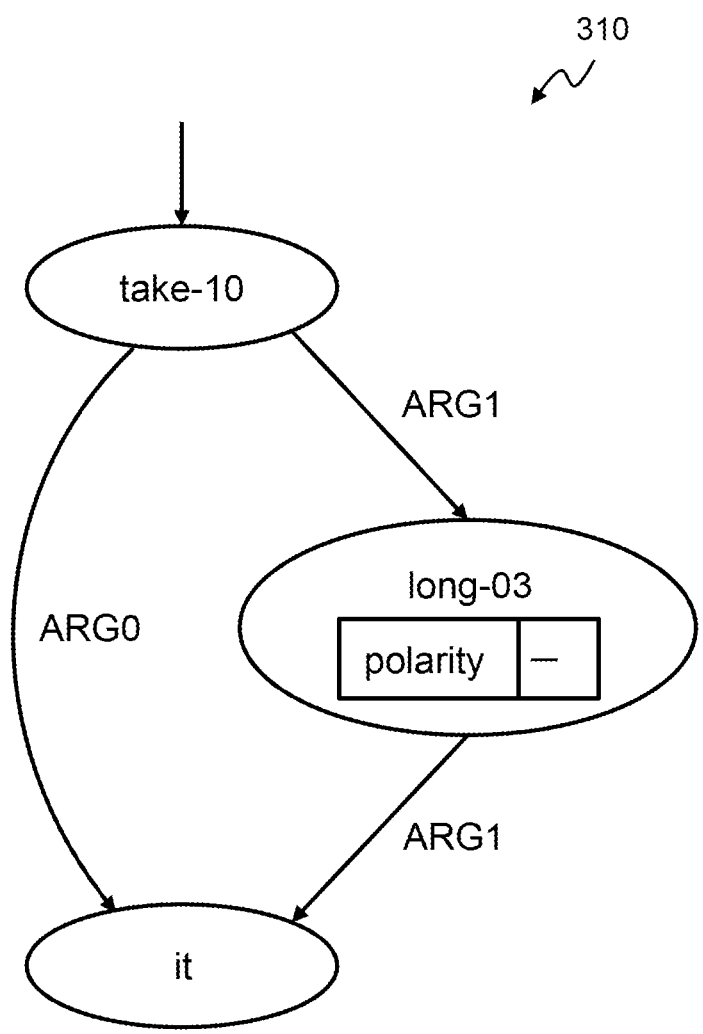
FIG. 4 is a diagram illustrating an example of a meaning representation graph.
Figure 5:
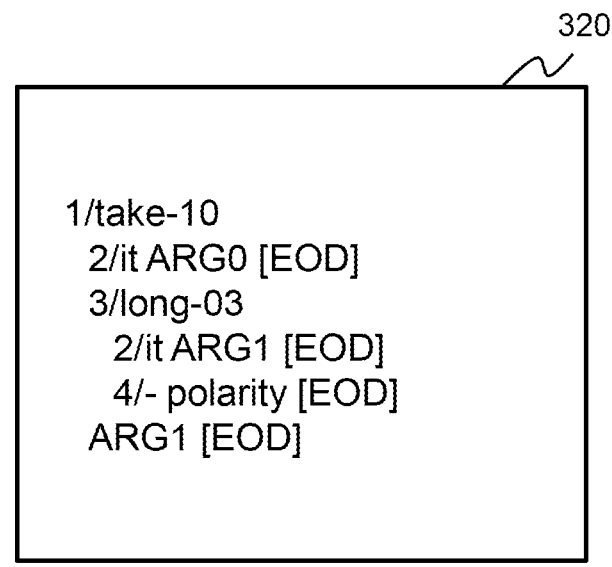
FIG. 5 is a diagram illustrating an example of a serialized graph.

FIG. 4 is a diagram illustrating an example of a meaning representation graph. A meaning representation graph 310 illustrated in FIG. 4 is a meaning representation graph corresponding to the English text "It didn't take long." And FIG. 5 is a diagram illustrating an example of a serialized graph. The serialized graph 320 illustrated in FIG. 5 is an example of a serialized graph corresponding to the meaning representation graph 310 illustrated in FIG. 4, and corresponds to an example of the serialized graph 220 generated by the serialized graph generating unit 120 when the English text is input as the input data 210.

The serialized graph 320 illustrated in FIG. 5 gives an equivalent description to the structure formed by the "edges" in the meaning representation graph 310. Note that, in FIG. 5, in order to improve visibility, the serialized graph 320 is displayed with insertion of line feed and blanks (spaces); however, in the actual serialized graph 320, line feed is not necessarily required, and a sequence (token array) may be formed by using each character string delimited by the blank character as one token.

In the serialized graph 320 of FIG. 5, the token including the slash symbol "/" is a token indicating a node, "ARG0" and "ARG1" are tokens indicating labels of edges, and "[EOD]" is a special token indicating a structure of an edge. A number described before the slash symbol represents an ID of the node (node ID), and a character string following the slash symbol represents a label of the node (node label).

Furthermore, in the serialized graph 320 of FIG. 5, a token indicating a node written from a position where a line is indented corresponds to a child node on the meaning representation graph 310. For example, in FIG. 5, "it" in the second line and "long-03" in the third line are indented with respect to "take-10" in the first line, and, with reference to the meaning representation graph 310 in FIG. 4 in relation to these nodes, it can be seen that "it" and "long-03" are child nodes of "take-10".

Here, focusing on the node "it", while it is one node in the meaning representation graph 310 of FIG. 4, "2/it" appears twice in the second row and the fourth row in the serialized graph 320 of FIG. 5. In the generation of the nodes having the same name appearing a plurality of times in the serialized graph, such as these "it", the identity determining unit 123 performs an operation of assigning the same ID or the like when these are the same nodes. Specifically, in the serialized graph 320 of FIG. 5, since ID "2" is assigned to both "it" in the second row and "it" in the fourth row, it is made clear that these are the same node.

The node labels on the meaning representation graph are not necessarily guaranteed to be unique in the graph. Therefore, in the serialized graph, it is necessary to add the above-described ID information and the like in order to guarantee uniqueness even for the same node label.

Next, the serialized graph converting unit 130 will be described.

The serialized graph converting unit 130 converts the serialized graph 220 generated by the serialized graph generating unit 120 into an appropriate format and transmits it to the output unit 140.

Since the serialized graph generating unit 120 is embodied by using a machine learning method such as a neural network, the serialized graph 220 generated by the serialized graph generating unit 120 does not necessarily generate a meaning representation graph in which the input data 210 is correctly serialized. Therefore, in the meaning representation parsing system 100, the serialized graph converting unit 130 performs conversion processing for constructing the edge information of the meaning representation graph as much as possible on the graph token array (the serialized graph 220) representing the meaning representation graph generated by the serialized graph generating unit 120. In the following description, for the sake of distinction, the serialized graph prior to conversion by the serialized graph converting unit 130 (that is, the serialized graph 220 generated by the serialized graph generating unit 120) may be referred to as a first serialized graph, and the serialized graph after conversion by the serialized graph converting unit 130 may be referred to as a second serialized graph.

Specifically, by processing the token array (graph token array) of the first serialized graph from the beginning, the serialized graph converting unit 130 can configure the edge information within a processable range even if the graph token array is an invalid input.

Figure 6:
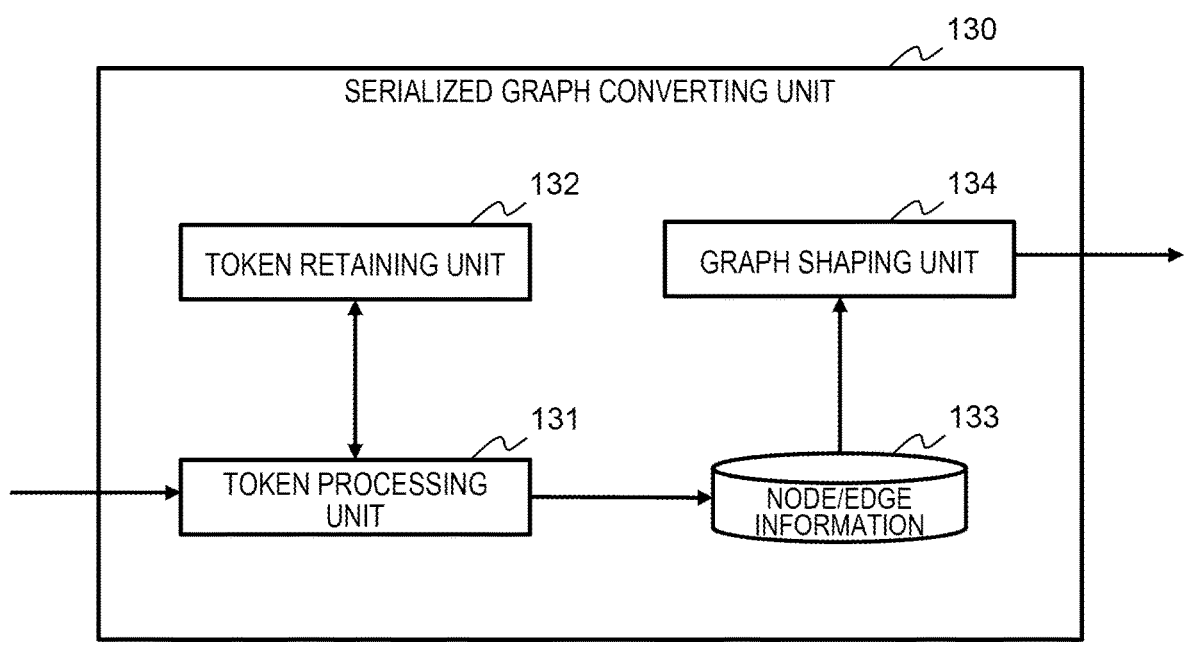
FIG. 6 is a block diagram illustrating an internal configuration example of a serialized graph converting unit 130.

FIG. 6 is a block diagram illustrating an internal configuration example of a serialized graph converting unit 130. As illustrated in FIG. 6, the serialized graph converting unit 130 includes a token processing unit 131, a token retaining unit 132, node/edge information 133, and a graph shaping unit 134.

In the serialized graph converting unit 130, first, the graph token array of the first serialized graph (serialized graph 220) is input to the token processing unit 131, and appropriate processing is sequentially performed by the token processing unit 131, so that either operation on the token retaining unit 132 or operation on the node/edge information 133 is performed.

Figure 7:
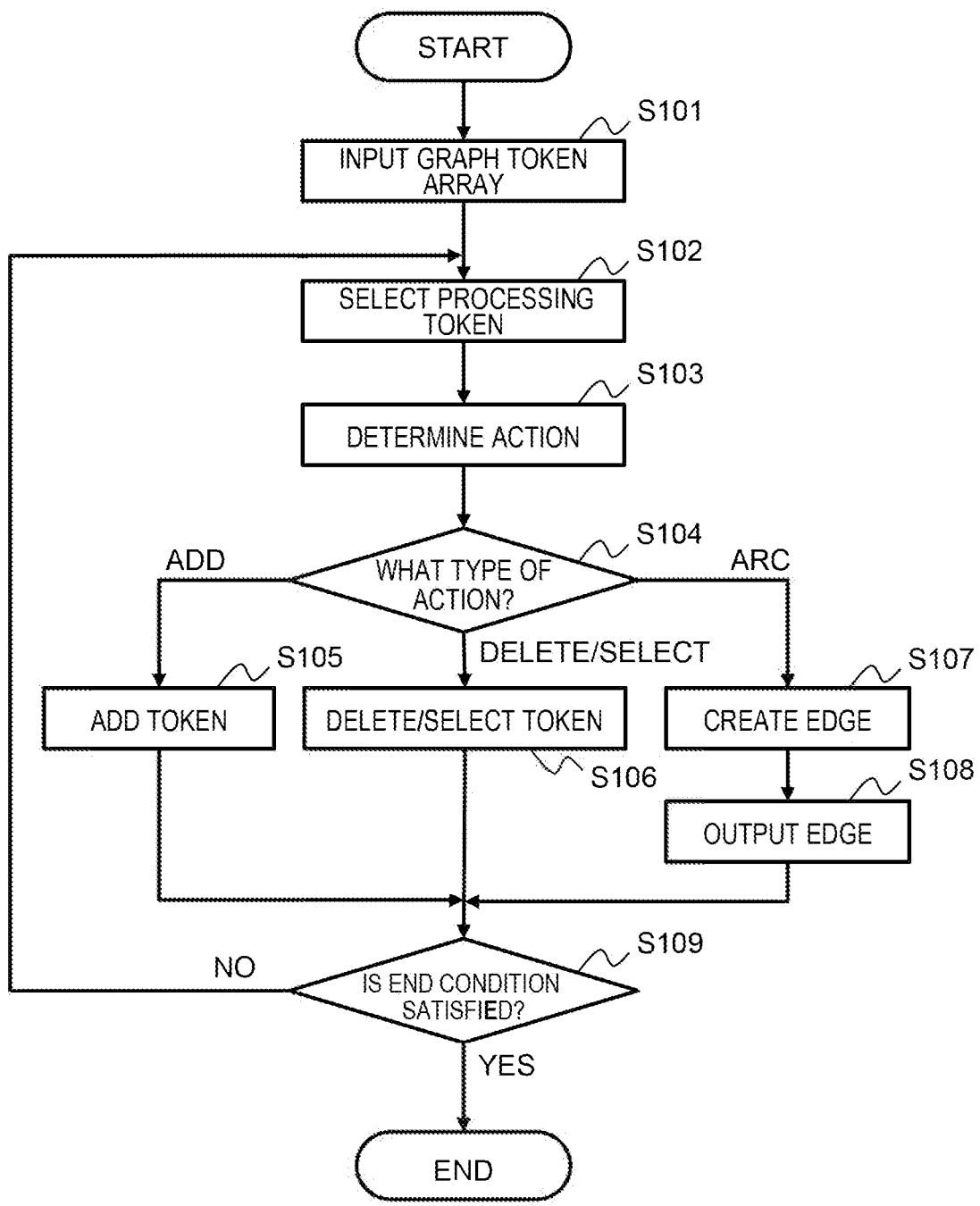
FIG. 7 is a flowchart illustrating an outline of processing by a token processing unit 131.

FIG. 7 is a flowchart illustrating an outline of processing by a token processing unit 131. According to FIG. 7, first, the graph token array serialized from the serialized graph 220 is input to the token processing unit 131 (step S101). Next, the token processing unit 131 selects one token to be subsequently processed from the token array input in step S101 (step S102), and determines an action to be applied to the selected token (step S103).

Note that, in the flowchart of FIG. 7, a method of sequentially executing processing for one token with respect to a plurality of tokens included in the graph token array input in step S101 is illustrated; however, the processing by the token processing unit 131 is not limited to such a method, and for example, step S102 may be skipped, and in step S103, after an action to be applied to each token of the graph token array input in step S101 is determined, subsequent processing for each token may be executed.

The determination of the action in step S103 will be described in detail. In the meaning representation parsing system 100 according to the present embodiment, an action corresponding to each type of token is defined in advance. Therefore, in step S103, the token processing unit 131 identifies the type of the token to be processed.

For example, in the case of the serialized graph 320 illustrated in FIG. 4, the token (for example, "1/take-10" or "2/it") corresponding to the node is represented by a notation in which the node ID and the node label are connected by a slash symbol. At this time, if it is guaranteed that the edge label (for example, "ARG0" or "ARG1") does not include the slash symbol, the token processing unit 131 can determine that the token including the slash symbol is the token corresponding to the node.

Therefore, the token description format of the serialized graph may be any format as long as the type of the token can be identified. Then, the token processing unit 131 includes an action determination method according to the token description format of the serialized graph, and in step S103, an action determined according to the type of the token can be determined by determining the type of the token based on the action determination method.

Next, the token processing unit 131 confirms the type of action to be applied determined in step S103 (step S104), and executes appropriate processing for each type of action (steps S105 to S107). Although the configuration of the action can be conceived in various ways, when roughly classified without losing generality, the token processing unit 131 executes any of an operation of adding a token to the token retaining unit 132 (ADD, step S105), an operation of deleting a token in the token retaining unit 132 (DELETE, step S106), an operation of selecting a token in the token retaining unit 132 (SELECT, step S106), and an operation of creating an edge (ARC, step S107). Among these four actions, ADD (step S105) and DELETE/SELECT (step S106) correspond to an operation on the token retaining unit 132. In addition, in the case of the action of ARC, after the edge is created in step S107, information of the created edge is output to the node/edge information 133 (step S108), which corresponds to an operation on the node/edge information 133. Note that the information on the edge output in step S108 also includes information on nodes at both ends of the edge. Then, the edge information output in step S108 is held in the node/edge information 133.

Note that ADD and ARC are essential as a set of actions to be applied according to the type of the token in the processing example of FIG. 7, but any connected graph can be described as long as at least one of DELETE and SELECT is included. However, in consideration of the efficiency of description and the like, both DELETE and SELECT may be included.

Then, after the processing for each action is performed in steps S105 to S108, the token processing unit 131 determines whether or not a predetermined end condition is satisfied (step S109), and in a case where the end condition is not satisfied (NO in step S109), the processing returns to step S102, selects a next token to be processed, and repeats the processing. On the other hand, in a case where the end condition is satisfied (YES in step S109), the processing by the token processing unit 131 is ended.

FIG. 8 is a diagram for describing a conversion procedure of the serialized graph in the first embodiment with a specific example. FIG. 8 illustrates a specific transition in a case where the serialized graph corresponding to the meaning representation graph 310 illustrated in FIG. 4 is converted by the processing procedure illustrated in FIG. 7, and a stack is used as the token retaining unit 132 that temporarily retains the token at the time of conversion.

In FIG. 8, a serialized graph 330 represents a serialized graph prior to conversion by the token processing unit 131 (that is, a first serialized graph). In this example, as the serialized graph 330 corresponding to the meaning representation graph 310 illustrated in FIG. 4, a serialized graph similar to the serialized graph 320 illustrated in FIG. 5 is used. However, in the serialized graph 330, description of the token related to "polarity" indicating the attribute value of the node"long-03" in the meaning representation graph 310 (corresponding to the fourth line in the serialized graph 320 of FIG. 5 and corresponding to the text "didn't") is omitted for convenience.

In addition, in FIG. 8, a processing token 331 represents a processing token selected from the serialized graph 330 by the token processing unit 131 (see step S102 in FIG. 7). In the case of FIG. 8, the serialized graph 330 includes 10 tokens which are sequentially selected from the first token as the processing token, and the conversion processing is performed. An action 332 represents a specific action executed in correspondence with the processing token 331. The stack state 333 represents a retained state of the stack in each stage.

As described above, the serialized graph 330 used in FIG. 8 is obtained by serializing the meaning representation graph 310 in FIG. 4. At this time, when the edges existing in the meaning representation graph 310 of FIG. 4 are listed as three triplets for convenience, [take-10,it,ARG0], [take-10, long-03,ARG 1], and [long-03,it,ARG1] are obtained. Hereinafter, it is described that the above three triplets representing the edges can be generated from the serialized graph 330 without excess or deficiency by performing the conversion processing by the token processing unit 131. As described in FIG. 7, according to the conversion processing by the token processing unit 131, it is possible to convert the three triplets into various graph description formats by causing the node/edge information 133 to retain the three triplets.

A specific conversion procedure will be described with reference to FIGS. 7 and 8. As described above, in this example, a stack is used for the token retaining unit 132, and the transition of the retained state is indicated by the stack state 333.

First, since "1/take-10" and "2/it" selected as the first and second processing tokens are tokens indicating nodes, an action (ADD) of adding a token is selected in step S103. In this case, the token processing unit 131 adds the token to the stack (the token retaining unit 132) in step S105. Since the stack retains data in a last in first out (LIFO) structure, the stack state 333 after processing of the second token retains tokens of "it" and "take-10" in order from the top.

Since "ARG0" selected as the third processing token is a token representing an edge, an action (ARC) of creating the edge is selected (step S103). In this case, the token processing unit 131 creates an edge [take-10,it,ARG0] using the first and second tokens from the top of the stack (step S107), and outputs information of the created edge to the node/edge information 133 (step S108). At this time, as information on the nodes at both ends of the edge, "take-10" is output as a node with the node ID "1" and "it" is output as a node with the node ID "2" to the node/edge information 133.

Since the [EOD] token selected as the fourth processing token is a special token indicating DELETE, an action (DELETE) of deleting one token retained in the stack (the token retaining unit 132) is selected (step S103). In this case, the token processing unit 131 deletes the token "2/it" retained first from the top of the stack (step S106). Note that the action of deleting data retained in the stack is also called "POP", instead of "DELETE".

Thereafter, the token processing unit 131 repeats execution of the action similarly in accordance with the type of the processing token.

Briefly explained, since "3/long-03" and "2/it" indicating nodes are selected as processing tokens in the fifth and sixth positions, an action to add a token (ADD) is selected and the processing token is added to the stack (the token retaining unit 132). Then, in the seventh position, since the token representing the edge "ARG1" is selected as the processing token, a new edge [long-03,it,ARG1] is created using the data retained in the stack, and is output to the node/edge information 133. Note that, at this time, since "2/it" has the same node ID "2" as the previously created node, only "long-03" is added as a new node to the node/edge information 133 as the node with the node ID "3".

Next, in the eighth position, since [EOD] which is a special token indicating DELETE is selected as the processing token, "2/it" which is the first token from the top of the stack is deleted from the stack. As a result, "long-03" and "take-10" are retained from the top of the stack that is the token retaining unit 132.

Subsequently, in the ninth position, since the token representing the edge "ARG1" is selected as the processing token, a new edge [take-10,long-03,ARG1] is created using the data retained in the stack, and is output to the node/edge information 133. At this time, since both "take-10" and "long-03" have the same node ID as the previously created node, they are not added as a new node to the node/edge information 133.

Lastly, in the tenth position, since [EOD] which is a special token indicating DELETE is selected as the processing token, "long-03" which is the first token from the top of the stack is deleted from the stack. As a result, only the "take-10" is held in the stack that is the token retaining unit 132.

In the case of FIG. 8, as can be seen from the serialized graph 330, since the processing for all the processing tokens is completed by the processing for [EOD] in the tenth position, the token processing unit 131 determines that the end condition is satisfied (YES in step S109) and ends the conversion processing.

To summarize the results of the conversion processing described above, three triplets of edges [take-10,it,ARG0], [long-03,it,ARG1], and [take-10, long-03, ARG1] are created, and together with the edge information of each set, "take-10" of the node ID "1", "it" of the node ID "2", and "long-03" of the node ID "3" are retained in the node/edge information 133 as the node information at both ends of the edge. That is, by the above conversion processing, the information indicating the three edges existing in the meaning representation graph 310 of FIG. 4 for convenience can be generated from the serialized graph 330 without excess or deficiency. In other words, by executing the above conversion processing, the serialized graph 330 (first serialized graph) generated by the serialized graph generating unit 120 from the input data 210 can be converted into the second serialized graph equivalent to the meaning representation graph 310.

Furthermore, in the serialized graph converting unit 130, the node/edge information 133 retains information of the node and the edge, so that conversion into an arbitrary graph description format can be performed. Next, the graph shaping unit 134 shapes the graph according to a specification of a desired graph description format using the information held in the node/edge information 133. In this shaping, for example, output may be performed in a form of a mathematical expression, an image, dots, or the like so that the user can visually comprehend the graph. Then, the graph shaping unit 134 outputs the data of the shaped graph to the output unit 140.

Furthermore, the above description of the serialized graph converting unit 130 is for converting the serialized graph 220 (first serialized graph) generated by the serialized graph generating unit 120 to correspond to an arbitrary graph description format. However, in a case where the meaning representation parsing system 100 is configured to output the serialized graph 220 itself, no special processing is required to be performed in the serialized graph converting unit 130.

Next, the output unit 140 and the output graph 230 will be described.

The output unit 140 deforms the data of the graph output from the serialized graph converting unit 130 as necessary so as to adapt to the interface to be output, and then outputs the data from a predetermined output device to present the graph to the user. As a means for presenting the graph to the user, for example, display of the graph by CUI, visualization of the graph by GUI, processing of writing the graph to a file, or the like is conceivable. Specifically, the meaning representation graph 310 illustrated in FIG. 4 is an output example of a visualized graph display, and when the graph is written to a CUI or a file, the meaning representation graph can be output in a form such as the serialized graph 320 illustrated in FIG. 5 and FIG. 8.

As described above, the meaning representation parsing system 100 according to the present embodiment includes the input unit 110, the serialized graph generating unit 120, the serialized graph converting unit 130, and the output unit 140, so that the meaning representation graph can be parsed from the input data 210 as the text.

Furthermore, in the following, a method of generating a serialized graph converted from the input graph and equivalent to the input graph in a case where the input data 210 is a graph in the meaning representation parsing system 100 according to the present embodiment will be described.

Figure 9:
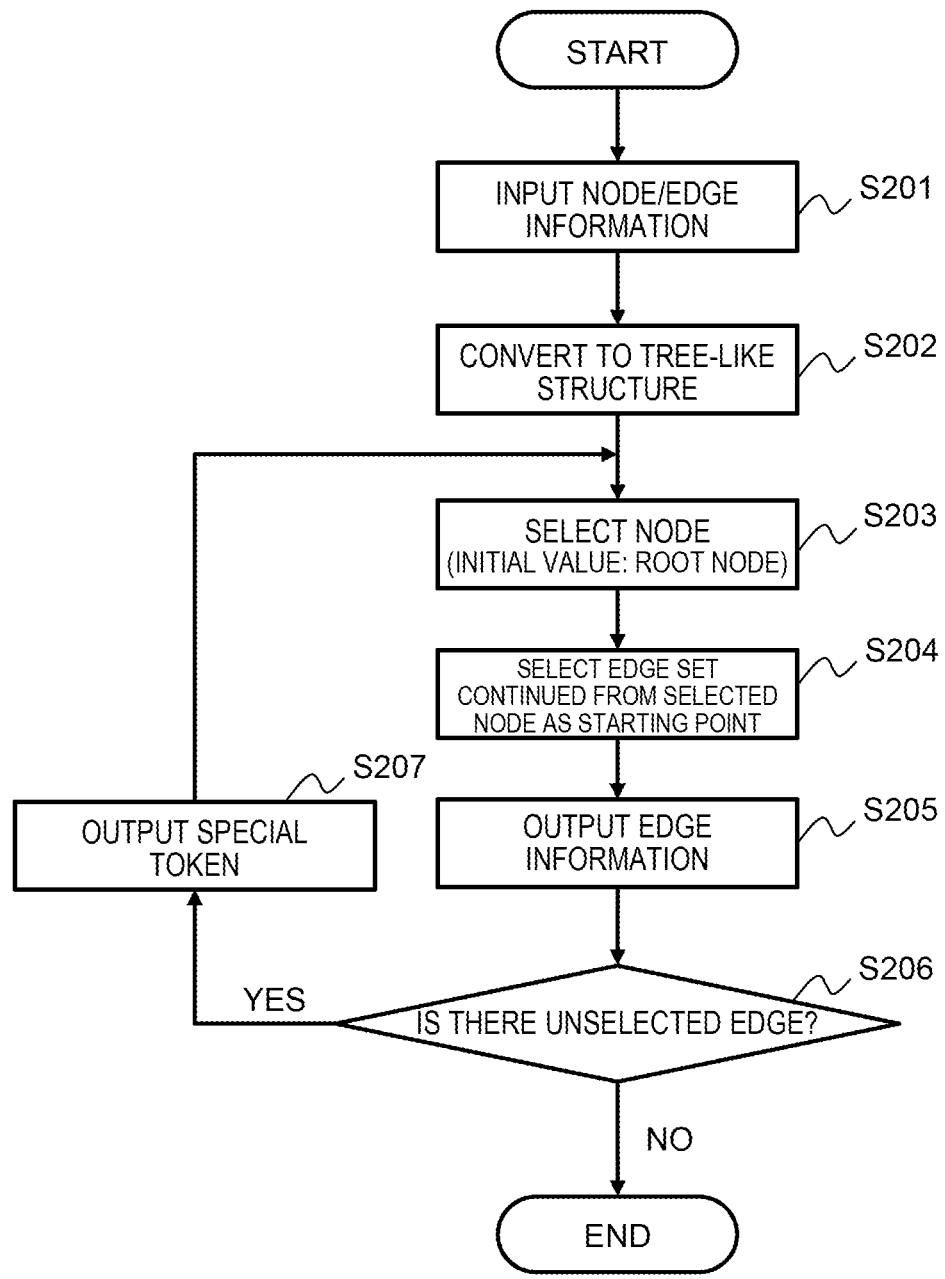
FIG. 9 is a flowchart illustrating an example of a processing procedure of processing of generating an equivalent serialized graph from input data of a graph in the first embodiment.

FIG. 9 is a flowchart illustrating an example of a processing procedure of processing of generating an equivalent serialized graph from input data of a graph in the first embodiment. The processing illustrated in FIG. 9 is executed by the input unit 110 when a graph is input as the input data 210. In addition, the generation of the serialized graph by the processing illustrated in FIG. 9 can also be used to generate a serialized graph to be used as train data for training when machine learning is used in the serialized graph generating unit 120. In a case where the serialized graph is generated for training of the machine learning, for example, the input unit 110 may perform processing, but a functional unit that executes the processing of FIG. 9 may be separately provided.

According to FIG. 9, first, information of nodes and edges constituting the graph is input to the input unit 110 (step S201).

Next, the input unit 110 converts the input graph indicated by the information of the nodes and the edges input in step S201 into a tree-like structure (step S202). It is assumed that the tree-like structure is a structure that always includes, for all nodes except the root node in the meaning representation graph, the root node at those ancestor nodes (nodes that can be reached by following the origins of the arrows in the graph). A difference between the tree-like structure and a general tree structure is that, in the case of the tree-like structure, the number of the parent node is not limited to one. The conversion into the tree-like structure in step S202 is processing performed to facilitate the subsequent processing in FIG. 9, but may not necessarily be essential processing.

In addition, as described above, in the converted tree-like structure, a plurality of root nodes may exist, but by adding a virtual root node having a plurality of root nodes as children, it can be regarded as the same as a graph having only one root node, and thus the root node can be treated as one.

Furthermore, in a case where the graph of the tree-like structure to be converted in step S202 is an undirected graph having one root node, in order to convert a directed graph that is a connected graph into a tree-like structure, it is necessary to appropriately invert the direction of the arrow. In this case, since the problem of the direction of the arrow can be solved by adding inversion of the direction of the arrow to the label information of the edge, the input unit 110 can convert to the above-described tree-like structure without loss of generality even when the directed graph is input as the input data 210. That is, the conversion can be embodied by decomposing the input graph into partial graphs having tree-like structures and determining edges connecting the partial graphs. At this time, the root node of the partial graph is a true root node of the input graph, or a node that served as a segmentation point of the partial graph.

Next, the input unit 110 selects a node serving as a starting point of the conversion in order to convert the graph in the tree-like structure into the serialized graph (step S203). At this time, it is desirable to select the root node first.

Next, the input unit 110 selects an edge set that can be reached by following the direction of the arrow of the edge from the node selected in step S203 as an end point (step S204). The edge set selected in step S204 is preferably an edge set that cannot be extended any more. Note that the "an edge set that cannot be extended" mentioned herein is not necessarily the longest edge set among the edge sets which can select the selected node as an end point.

Next, the input unit 110 serializes and outputs the edge set selected in step S204 (step S205). The method of serialization in step S205 conforms to the description format of the serialized graph. For example, in the case of the description format of the serialized graph illustrated in FIGS. 5 and 8, description may be performed in an appropriate token description format in the order of [original node of arrow, destination node of arrow, label of edge] for each edge. In the example of the description format of the serialized graph illustrated in FIGS. 5 and 8, in the case of the token representing the node, the ID and the label of the node may be connected by a slash symbol, and the edge label may be output as it is. However, for a graph to which a node ID is not explicitly assigned, the ID can be freely assigned so that the node can be identified.

Next, the input unit 110 determines whether or not there remains an edge that has not been selected in the processing up to step S205 among the edges included in the graph of the tree-like structure (whether or not there remains an edge for which edge information has not been output) (step S206), and in a case where there remains no edge that has not been selected (NO in step S206), the input unit 110 ends the processing as it is.

On the other hand, in a case where there remains an unselected edge (YES in step S206), the input unit 110 adds (outputs) the special token as necessary (step S207). The special token added in step S207 is, for example, the [EOD] token in the case of the description format of the serialized graph illustrated in FIGS. 4 and 8.

Then, after step S207, the processing returns to step S203, and the input unit 110 selects a node serving as the next starting point and repeats the processing of step S204 and later. At this time, as a display method (output method) of the node serving as the starting point, a method of directly outputting (or re-outputting) the node serving as the starting point, a method of tracing back the edges from the node serving as the end point of the previous edge set by the number of [EOD] tokens, or the like can be employed. The latter method is a method corresponding to the description format of the serialized graphs in FIGS. 4 and 8, and corresponds to the operation of removing the token from the stack.

As described above, the input unit 110 can generate a serialized graph (a serialized graph converted from the input graph) equivalent to the input graph (for example, the meaning representation graph 310) by repeating the processing of steps S203 to S207 of FIG. 9 until all the edge information is output.

Note that, in serialization performed in step S205 in FIG. 9, for example, in a case where an attribute value (For example, the "polarity" value at the "long-03" node in FIG. 4) is assigned to a node or an attribute value is assigned to an edge, the input unit 110 can perform serialization including the attribute value by adding the attribute value to a label of the node or the edge in a certain notation.

As described above, according to the meaning representation parsing system 100 according to the first embodiment, since it is possible to serialize directed or undirected graphs including label information for nodes and edges, it is possible to parse various types of meaning representations in a general-purpose (unified) manner with high accuracy to form a serialized graph.

In addition, the meaning representation parsing system 100 according to the present embodiment can accurately generate the serialized graph using the tokenized text or the serialized graph as an input using a neural network of a so-called encoder/decoder, and thus can uniformly parse various meaning representations without designing an action for each meaning representation graph as compared with a conventionally known Transition-based Parser or the like.

In addition, since the format of the serialized graph generated by the meaning representation parsing system 100 according to the present embodiment retains information of the entire graph, for example, learning of the structure of the entire graph can be performed in the neural network of the encoder/decoder, and it is possible to parse the meaning representation graph based on not only the local relationship between the nodes but also the global characteristic.

Furthermore, in the meaning representation parsing system 100 according to the present embodiment, a certain meaning representation graph can be converted into another meaning representation graph by using the serialized graph as an input.

Further, as in the meaning representation parsing system 100 according to the present embodiment, the output in the serialized graph format is serialized when the two meaning representation graphs are compared, so that the output can be compared using a numerical value, for example, using a general edit distance or the like. Similarly, since the difference between the graphs can be calculated as an edit operation (insertion, deletion, or the like) on the serialized graph, processing using the difference can be performed. As a use of the difference, for example, by regarding a difference in meaning between two texts as a difference of the serialized graph, it is possible to determine implicature and antonymy through the scrutiny of the difference.

Note that, in a case where the meaning representation parsing system 100 according to the present embodiment is used, the user can appropriately add an operation on the meaning representation graph. As a typical example, by converting the written problem into a graph representing a mathematical formula as input data to the meaning representation parsing system 100, a solution of the written problem can be calculated by actually performing calculation.

Second Embodiment

In the second embodiment, a format of a serialized graph different from that of the first embodiment will be described. In the second embodiment, a meaning representation parsing system 100 configured in the same manner as in the first embodiment can be used.

FIG. 10 is a diagram for describing a conversion procedure of the serialized graph in the second embodiment with a specific example. The serialized graph 340 illustrated in FIG. 10 is an example of a serialized graph obtained by serializing the meaning representation graph 310 illustrated in FIG. 4, but is described in a format different from the serialized graph 320 (FIG. 5) and the serialized graph 330 (FIG. 8) exemplified in the first embodiment. In the second embodiment, the serialized graph 340 illustrated in FIG. 10 is, for example, an example of a serialized graph that can be generated by the input unit 110, and a generation method thereof will be described later with reference to FIG. 11.

Hereinafter, the conversion processing by the serialized graph converting unit 130 (mainly the token processing unit 131) with respect to the serialized graph 340 illustrated in FIG. 10 will be described, to indicate that it is possible to construct the edge information equivalent to the input meaning representation graph, similarly to the serialized graph 330 or the like of the first embodiment, even in the case of the serialized graph 340 having a description format different from that of the first embodiment. In the conversion of the serialized graph illustrated in FIG. 10, similarly to FIG. 8, a stack is used for the token retaining unit 132.

Note that the processing token 341, the action 342, and the stack state 343 in FIG. 10 are similar to the processing token 331, the action 332, and the stack state 333 illustrated in FIG. 8, respectively, and therefore description thereof is omitted. Furthermore, the description of each stage of FIG. 10 is similar to the description of FIG. 8 in many points, and thus will be simplified.

According to FIG. 10, first, since "1/take-10", "2/it", and "3/long-03" selected as processing tokens from the first to the third positions are tokens indicating nodes, an action (ADD) of adding a token is selected (step S103 in FIG. 7), and the processing token is added to the stack that is the token retaining unit 132 (step S105 in FIG. 7).

Next, since "1" selected as the processing token in the fourth position indicates the node added as the node ID "1" in the previous processing, the action (SELECT) of selecting a token is selected (step S103 in FIG. 7), and the token "1/take-10" corresponding to the processing token is selected and added to the stack again (same as step S106).

Next, when "ARG0-of" which is the token representing the fifth edge is selected as the processing token, the token processing unit 131 selects an action (ARC) of creating an edge (step S107 in FIG. 7), and creates an edge using the first and second tokens from the top of the stack which is the token retaining unit 132. At this time, according to the conversion method of FIG. 8 described in the first embodiment, the edge to be created is [it (second),take-10 (first), ARG0 (edge)], but "-of" included in the selected processing token "ARG0-of" indicates that the arrow of the edge is inverted. Therefore, the token processing unit 131 replaces the nodes constituting both ends of the edge to generate the edge [take-10,it,ARG0]. Then, the token processing unit 131 outputs the generated information of the edge to the node/edge information 133 (step S108), and outputs the information of the nodes at both ends of the edge to the node/edge information 133 with "take-10" as the node with the node ID "1", and "it" as the node with the node ID "2".

Furthermore, in the conversion processing in the second embodiment, in a case where the processing token is a token representing an edge, it is assumed that an action of DELETE is also selected after the above-described ARC (ARC+DELETE). Therefore, after generating the edge [take-10,it,ARG0] and outputting the information to the node/edge information 133, the token processing unit 131 deletes the token "1/take-10" retained in the first position from the top of the stack.

Thereafter, the token processing unit 131 repeats execution of the action similarly in accordance with the type of the processing token.

Briefly explained, in the sixth place, since "ARG1" which is a token representing an edge is selected as a processing token, an action of creating an edge and deleting a token (ARC+DELETE) is selected. Therefore, the token processing unit 131 first performs an ADD action to generate a new edge [long-03,it,ARG1], and outputs information of the edge to the node/edge information 133. At this time, the new node "long-03" is also output as the node with the node ID "3". Furthermore, the token processing unit 131 deletes the token "2/it" retained in the first position from the top of the stack by performing a DELETE action.

Next, in the seventh place, since "ARG1" which is a token representing an edge is selected as a processing token, an action of creating an edge and deleting a token (ARC+DELETE) is selected. At this time, the token processing unit 131 generates a new edge [take-10,long-03,ARG1] by performing an ADD action and outputs the new edge to the node/edge information 133. Further, the token processing unit 131 deletes the token "long-03" retained in the first position from the top of the stack by performing a DELETE action.

Then, since the process for all the tokens of the serialized graph 340 is ended by the process for the "ARG1" in the seventh position, the token processing unit 131 determines that the end condition is satisfied and ends the conversion processing.

To summarize the results of the conversion processing described above, three triplets of edges [take-10,it,ARG0], [long-03,it,ARG1], and [take-10, long-03, ARG1] are created, and together with the edge information of each set, "take-10" of the node ID "1", "it" of the node ID "2", and "long-03" of the node ID "3" are retained in the node/edge information 133 as the node information at both ends of the edge. That is, similarly to the conversion from the serialized graph 330 described in the first embodiment, the meaning representation parsing system 100 can also generate information indicating the three edges existing in the meaning representation graph 310 of FIG. 4 from the serialized graph 340 of FIG. 10 without excess or deficiency. That is, it is shown that the serialized graph 340 is a serialized graph equivalent to the meaning representation graph 310.

Figure 11:
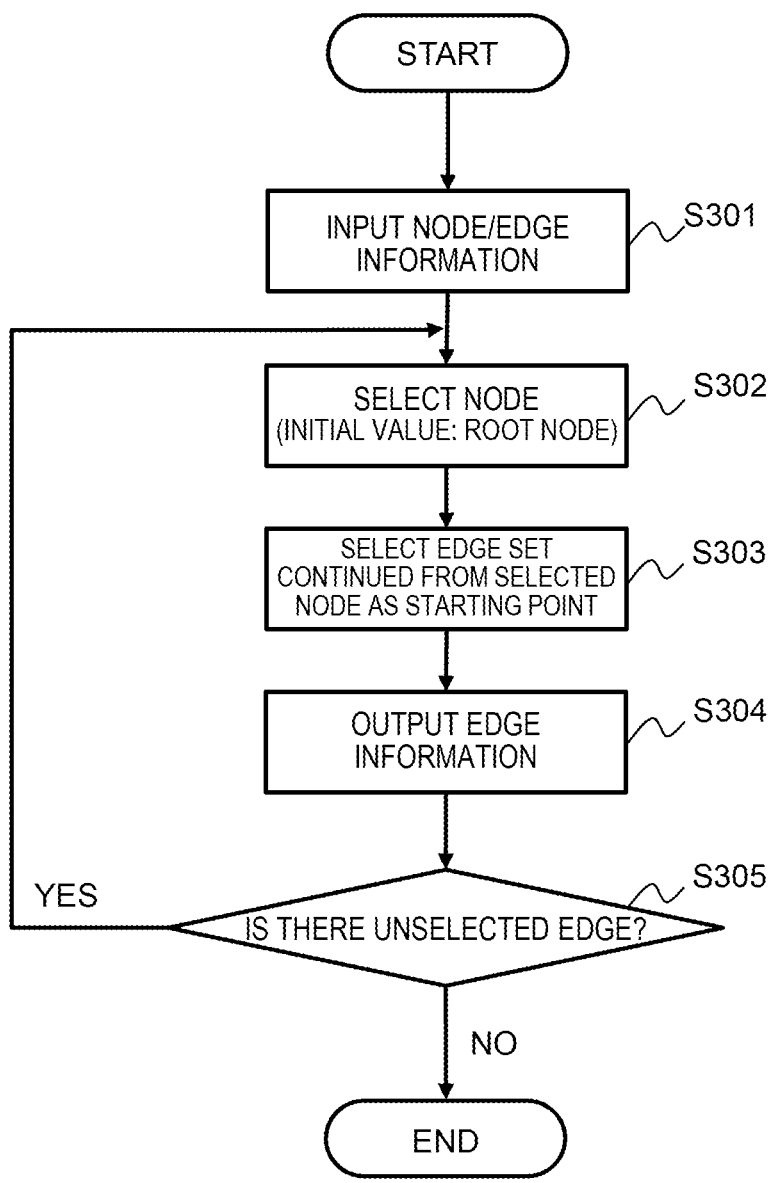
FIG. 11 is a flowchart illustrating an example of a processing procedure of processing of generating an equivalent serialized graph from input data of a graph in the second embodiment.

FIG. 11 is a flowchart illustrating an example of a processing procedure of processing of generating an equivalent serialized graph from input data of a graph in the second embodiment. A method in which the meaning representation parsing system 100 according to the second embodiment generates the serialized graph 340 illustrated in FIG. 10 when the meaning representation graph 310 illustrated in FIG. 4 is input as the input data 210 will be described with reference to FIG. 11. The processing illustrated in FIG. 11 is executed by the input unit 110, for example. In addition, since the processing illustrated in FIG. 11 is substantially similar to the processing illustrated in FIG. 9, description of common processing will be omitted, and differences will mainly be described.

First, in the method for generating a serialized graph illustrated in FIG. 11, it is not necessary to convert the input graph into a tree-like structure as in step S202 of FIG. 9. Therefore, after the information of the nodes and the edges constituting the input graph is input in step S301, the input unit 110 may select the node serving as the starting point of the conversion in order to convert the input graph into the serialized graph in step S302, similarly to step S203 in FIG. 9.

In the next step S303, the input unit 110 selects a continuous edge set (path that can be written in one stroke) starting from the node selected in step S302, but at this time, it is not necessary to consider the direction of the arrow of the edge as in step S204 in FIG. 9. That is, in step S303, when selecting an edge set that can be written in one stroke with the selected node as a starting point, for an edge in which the direction of the arrow needs to be inverted, the input unit 110 may give a predetermined identifier indicating the inversion of the arrow, such as "-of", to the label of the edge.

Next, in step S304, the input unit 110 serializes and outputs the edge set selected in step S303. At this time, the input unit 110 generates a token indicating each node in the order of the one-stroke writing path from the node serving as the starting point (the selected node in step S303), and generates a token indicating the corresponding edge in the same order.

Then, in step S305, the input unit 110 determines whether or not an edge of which the edge information has not been output remains, and repeats the processing of steps S302 to S304 until the information of all the edges is output. Note that, as illustrated in FIG. 10, in the description format of the serialized graph 340 in the second embodiment, when a token indicating a node appears after a token indicating an edge, a block of continuous edge information can be determined to be a block of new continuous edge information. Therefore, it is not necessary to execute processing of inserting a special token or the like as in step S207 of FIG. 9 before returning to step S302 and selecting a new node for outputting new edge information.

As described above, by repeating the processing of FIG. 11 until all the edge information is output, the input unit 110 can generate the serialized graph 330 equivalent to the input graph (for example, the meaning representation graph 310) in a description format different from the serialized graph 340 described in the first embodiment.

According to the meaning representation parsing system 100 according to the second embodiment described above, since it is possible to serialize directed or undirected graphs including label information for nodes and edges as in the first embodiment, it is possible to parse various types of meaning representations in a general-purpose (unified) manner with high accuracy to form a serialized graph.

Furthermore, when the second embodiment is compared with the first embodiment, the description format of the serialized graph 340 that can be generated in the second embodiment can be described with fewer tokens than the format of the serialized graph 330 that can be generated in the first embodiment. The ability to generate a serialized graph in a description format having such characteristics may be advantageous when generating a serialized graph in a neural network of an encoder/decoder.

However, the format of the serialized graph in the first embodiment focuses on the fact that many meaning representation graphs have a structure (tree-like structure) similar to a tree structure, and description is made in accordance with the structure, and the form of the serialized graph 330 that can be generated in the first embodiment may work more advantageously depending on meaning or formal constraints on the shape of the meaning representation graph.

In any case, by using the meaning representation parsing system 100 according to the present invention, the user can select the form of the serialized graph in the first embodiment, the form of the serialized graph in the second embodiment, or the format of another serialized graph in a similar manner, and specifically, it is possible to select a description format or the like with higher accuracy for the neural network of the encoder/decoder.

In addition, in the first embodiment and the second embodiment, since the serialized graph format generated by the meaning representation parsing system 100 is based on the edge information, it is possible to convert each other. Therefore, when the serialized graph is generated in the serialized graph generating unit 120, even if the neural network of the encoder/decoder outputs the serialized graph in a specific description format, the serialized graph converting unit 130 can appropriately convert the serialized graph into a desired format.

Note that the above-described embodiments have been described in detail in order to describe the present invention in an easily understandable manner, and are not necessarily limited to those having all the described elements and configurations. Therefore, the present invention is not limited to the above-described embodiments, and may include various modifications within a reasonable range. For example, as long as there is no contradiction, some of the elements and configurations of a certain embodiment may be replaced with the configurations of other embodiments, and the elements and configurations of other embodiments may be added to the elements and configurations of a certain embodiment. Furthermore, addition, deletion, substitution, integration, or distribution of an element or a configuration may be executed for a part of the element or the configuration of each embodiment. Furthermore, the elements, configurations, and processing described in the embodiments may be appropriately distributed, integrated, or replaced based on processing efficiency or implementation efficiency.

In addition, some or all of the above-described configurations, functions, processing units, processing means, and the like may be embodied by hardware, for example, by designing on an integrated circuit. In addition, each of the above-described configurations, functions, and the like may be embodied by software by a processor interpreting and executing a program realizing each function. Information such as a program, a table, and a file for realizing each function can be stored in a storage device such as a memory, a hard disk, and a solid-state drive (SSD), or a recording medium such as an IC card, an SD card, and a DVD.

In addition, in the drawings, only the control lines and the information lines considered to be necessary for the description are shown, and not necessarily all the control lines and the information lines in the product are shown. In practice, it may be considered that almost all the configurations are connected to each other.

DESCRIPTION OF REFERENCE NUMERALS

10 computer device
11 processor
12 storage device
13 input device
14 output device
15 communication interface
16 bus
100 meaning representation parsing system
110 input unit
120 serialized graph generating unit
121 token segmenting unit
122 sequence generating unit
123 identity determining unit
130 serialized graph converting unit
131 token processing unit
132 token retaining unit
133 node/edge information
134 graph shaping unit
140 output unit
210 input data
220 serialized graph
230 output graph
310 meaning representation graph
320, 330, 340 serialized graph

What is claimed is:

1. A meaning representation parsing system that parses a meaning representation of input data, the meaning representation parsing system comprising:
   a storage storing a program; and
   a processor executing the program to perform:
   an input processing that accepts the input data in a text or a graph; and
   a serialized graph generating processing that generates a token array representing a graph structure corresponding to the input data using a neural network encoder-decoder architecture,
   wherein the token array includes at least a first token indicating a node in the graph structure corresponding to the input data and a second token indicating an edge representing a relationship between the nodes, and
   wherein the neural network encoder-decoder architecture is trained to parse various meaning representations uniformly without designing specific actions for each meaning representation graph.

2. The meaning representation parsing system according to claim 1, wherein the token array generated by the serialized graph generating processing equivalently describes the meaning representation of the input data.

3. The meaning representation parsing system according to claim 1, wherein the serialized graph generating processing includes an identity determining processing that, with regard to the first token included in the token array representing the graph structure, determines identity of nodes on a graph and gives information indicating identity to a plurality of corresponding first tokens.

4. The meaning representation parsing system according to claim 1, wherein, when the input data is a text, the input processing converts the text in the input data into a predetermined character code enabling generation of the token array in the serialized graph generating processing, and inputs the input data converted, to the serialized graph generating processing.

5. The meaning representation parsing system according to claim 1, wherein, when the input data is a graph, the input processing converts the input data into a token array equivalent to the graph and described in a same description format as the token array generated by the serialized graph generating processing, and inputs the input data converted, to the serialized graph generating processing.

6. The meaning representation parsing system according to claim 1,
   wherein the processor executing the program to perform:
   a serialized graph converting processing that performs conversion processing for constructing information of the edge in the graph structure for a first token array that is generated by the serialized graph generating processing and represents the graph structure corresponding to the input data, to convert the first token array into a second token array,
   wherein the serialized graph converting processing executes an action corresponding to a type of the token for each token constituting the first token array in the conversion processing.

7. The meaning representation parsing system according to claim 6, wherein the serialized graph converting processing enables conversion of a description format between the first token array and the second token array while maintaining equivalent description of the meaning representation of the input data in the conversion processing.

8. The meaning representation parsing system according to claim 6, wherein the first token array and the second token array are described in either a first description format described in accordance with a graph structure corresponding to the input data or a second description format described so as to suppress a number of tokens constituting the token array.

9. A meaning representation parsing method by a meaning representation parsing system that parses a meaning representation of input data, the meaning representation parsing method comprising:
- an input step of accepting the input data in a text or a graph; and
- a serialized graph generating step of generating a token array representing a graph structure corresponding to the input data based on the input data accepted in the input step using a neural network encoder-decoder architecture,
- wherein the token array includes at least a first token indicating a node in the graph structure corresponding to the input data and a second token indicating an edge representing a relationship between the nodes, and
- wherein the neural network encoder-decoder architecture is trained to parse various meaning representations uniformly without designing specific actions for each meaning representation graph.

* * * * *